(12) United States Patent
Yeom (10) Patent No.: US 11,495,975 B2
(45) Date of Patent: Nov. 8, 2022

(54) BATTERY SYSTEM, AND METHOD OF ALLOCATING CAN ID

(71) Applicant: Samsung SDI Co., Ltd., Yongin-si (KR)

(72) Inventor: Gilchoun Yeom, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 64 days.

(21) Appl. No.: 17/094,220

(22) Filed: Nov. 10, 2020

(65) Prior Publication Data

US 2021/0143648 A1 May 13, 2021

(30) Foreign Application Priority Data

Nov. 13, 2019 (KR) .................. 10-2019-0145402

(51) Int. Cl.
*H02J 7/00* (2006.01)
(52) U.S. Cl.
CPC .......... *H02J 7/0013* (2013.01); *H02J 7/0029* (2013.01); *H02J 7/00032* (2020.01); *H02J 7/0047* (2013.01)
(58) Field of Classification Search
CPC ....................................................... H02J 7/00
See application file for complete search history.

(56) References Cited

U.S. PATENT DOCUMENTS

| 8,933,671 B2 | 1/2015 | Lee et al. | |
|---|---|---|---|
| 2014/0091770 A1* | 4/2014 | Lee | H02J 7/04 320/135 |
| 2014/0365792 A1 | 12/2014 | Yun | |
| 2015/0249353 A1 | 9/2015 | Hamilton, IV et al. | |

(Continued)

FOREIGN PATENT DOCUMENTS

| CN | 103718425 A | 4/2014 |
|---|---|---|
| CN | 105186610 A | 12/2015 |

(Continued)

OTHER PUBLICATIONS

Taiwan Office Action (including Search Report) dated Sep. 15, 2021, corresponding to TW Application No. 109139666; 6 pps.

(Continued)

*Primary Examiner* — Robert Grant
(74) *Attorney, Agent, or Firm* — Lewis Roca Rothgerber Christie LLP (57) ABSTRACT

A battery system includes a system controller connected to a controller area network (CAN) bus, and stations respectively connected to nodes of the CAN bus, wherein, a first station of the stations is configured to detect that a first battery pack has been coupled thereto, and is configured to transmit a first detection signal to the system controller, wherein the system controller is configured to provide a first wake-up signal for waking up the first battery pack to the first station in response to the first detection signal, wherein the first station is configured to wake up a first battery controller of the first battery pack in response to the first wake-up signal, and wherein the system controller is configured to be woken up and to transmit a command for allocating a first identifier (ID) corresponding to the first station to the first battery controller having a default ID via the CAN bus.

10 Claims, 9 Drawing Sheets

(56) References Cited

U.S. PATENT DOCUMENTS

2016/0020622 A1    1/2016  Kwon et al.
2016/0118696 A1*  4/2016  Ahn .................... H02J 7/00047
                                                             429/50
2017/0256825 A1    9/2017  Sun et al.

FOREIGN PATENT DOCUMENTS

| | | |
|---|---|---|
| EP | 2 725 686 A1 | 4/2014 |
| EP | 2 840 643 A1 | 2/2015 |
| KR | 10-1433478 B1 | 9/2014 |
| KR | 10-1561885 B1 | 10/2015 |
| KR | 10-2017-0051071 A | 5/2017 |
| TW | 201733234 A | 9/2017 |

OTHER PUBLICATIONS

European Search Report; Application No. 20207555.2, dated Feb. 18, 2021, 7 pages.

* cited by examiner

BATTERY SYSTEM, AND METHOD OF ALLOCATING CAN ID

CROSS-REFERENCE TO RELATED APPLICATION

This application claims priority to, and the benefit of, Korean Patent Application No. 10-2019-0145402, filed on Nov. 13, 2019, in the Korean Intellectual Property Office, the disclosure of which is incorporated herein in its entirety by reference.

BACKGROUND

1. Field

One or more embodiments relate to a battery system, and to a method of allocating a controller area network (CAN) identifier (ID).

2. Description of Related Art

Battery systems refer to various types of systems that supply power to batteries or that use power stored in the batteries. A battery charging system that supplies power to batteries, a so-called battery charging station, an electric vehicle or electric bicycle using power stored in the battery, and an energy storage system that uses the batteries as power storage, may be referred to as a battery system.

The battery system monitors the internal state of a battery pack for stable operation, and collects data measured by monitoring. In this case, the battery system may employ a master-slave structure for efficient management of the battery pack or data. Battery controllers of the battery packs functioning as a slave transmit detected data to a system controller functioning as a master (or host), and the system controller collects data transmitted by battery controllers.

Various types of wired/wireless communication are used to exchange information between the system controller and the battery controllers. In controller area network (CAN) communication, which is a typical communication method of wired communication, the system controller and the battery controllers share a CAN bus composed of two signal lines CAN-H and CAN-L. The battery controllers are respectively connected to nodes of the CAN bus, and unique identifiers (hereinafter referred to as 'IDs') are assigned to the battery controllers, and the system controller can collect information transmitted by the battery controllers.

The battery system may be equipped with modular battery packs. To eliminate the inconvenience of taking a considerable amount of time to charge the battery pack, attempts have been made to operate the battery system by replacing the battery pack. In the case of replacing the battery pack in this way, when an ID corresponding to a position where the battery pack is mounted is allocated to the battery controller, the battery pack corresponding to the ID can be identified by the ID alone.

Because battery packs according to the related art use one ID as a fixed type, it might not be possible to exchange information with the system controller through a CAN communication method. Also, even if the battery packs according to the related art use different fixed IDs, in the case of replacing the battery pack, the system controller needs to know the IDs of the battery packs in advance. Further, the IDs of the battery packs and positions where the battery packs are mounted need to be matched to each other and displayed to a user, so that the user can intuitively know the state of the battery pack.

SUMMARY

One or more embodiments relate to a battery system that may operate quickly and stably after a battery pack is replaced, and a method of allocating a new identifier (ID) to the replaced battery pack.

According to one or more embodiments, a battery system includes a system controller connected to a controller area network (CAN) bus, and stations respectively connected to nodes of the CAN bus, wherein, a first station of the stations is configured to detect that a first battery pack has been coupled thereto, and is configured to transmit a first detection signal to the system controller, wherein the system controller is configured to provide a first wake-up signal for waking up the first battery pack to the first station in response to the first detection signal, wherein the first station is configured to wake up a first battery controller of the first battery pack in response to the first wake-up signal, and wherein the system controller is configured to be woken up and to transmit a command for allocating a first identifier (ID) corresponding to the first station to the first battery controller having a default ID via the CAN bus.

The first battery controller may be configured to have the default ID immediately after being woken up, to respond to a message to the default ID transmitted by the system controller, to change the default ID into the first ID in response to the command for allocating the first ID, and to respond to a message to the first ID transmitted by the system controller.

The first station may be configured to transmit the first wake-up signal to the first battery controller, wherein the first battery controller is configured to be woken up while having the default ID in response to the first wake-up signal.

The first station may be configured to generate a charging voltage for charging the first battery pack in response to the first wake-up signal, and to output the generated charging voltage to the first battery pack, and the first battery controller is woken up in response to the charging voltage.

The battery system may be a battery pack charging system for respectively charging battery packs that are attachable/detachable to/from the stations.

The first station may include a sensor configured to detect whether the first battery pack has been coupled with the first station, and to generate the first detection signal.

The battery system may further include battery packs respectively coupled with the stations, the battery packs including at least one battery cell, a protection circuit configured to protect the at least one battery cell, and a battery controller that is configured to monitor a state of the at least one battery cell to control the protection circuit, and that is connected to the CAN bus through a corresponding station of the stations.

The stations may be arranged in an order, wherein IDs corresponding to the order are allocated to battery packs coupled with the stations.

According to one or more embodiments, a method of allocating a controller area network (CAN) identifier (ID) in a battery system that includes a system controller connected to a CAN bus, and stations respectively connected to nodes of the CAN bus, the method including detecting, by a first station of the stations, that a first battery pack has been coupled with the first station, transmitting a first detection signal to the system controller, providing a first wake-up signal for waking up the first battery pack to the first station in response to the first detection signal by using the system controller, waking up a first battery controller of the first battery pack in response to the first wake-up signal by using the first station, transmitting a command for allocating a first ID corresponding to the first station to the first battery controller being woken up and having a default ID, via the CAN bus, by using the system controller, and changing the default ID into the first ID in response to the command for allocating the first ID by using the first battery controller.

The waking up of the first battery controller may include generating a charging voltage for charging the first battery pack in response to the first wake-up signal and outputting the generated charging voltage to the first battery pack by using the first station, and waking up the first battery controller in response to the charging voltage.

Embodiments will be described in more detail with reference to the accompanying drawings, so that aspects will be apparent to those skilled in the art.

BRIEF DESCRIPTION OF THE DRAWINGS

The above and other aspects of embodiments of the disclosure will be more apparent from the following description taken in conjunction with the accompanying drawings, in which.

DETAILED DESCRIPTION

Aspects of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects and features of some embodiments of the present disclosure might not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

The terminology used herein is for the purpose of describing particular embodiments only and is not intended to be limiting of the present disclosure. As used herein, the singular forms "a", "an", and "the" are intended to include the plural forms as well (especially in the context of the claims), unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the disclosed embodiments belong. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
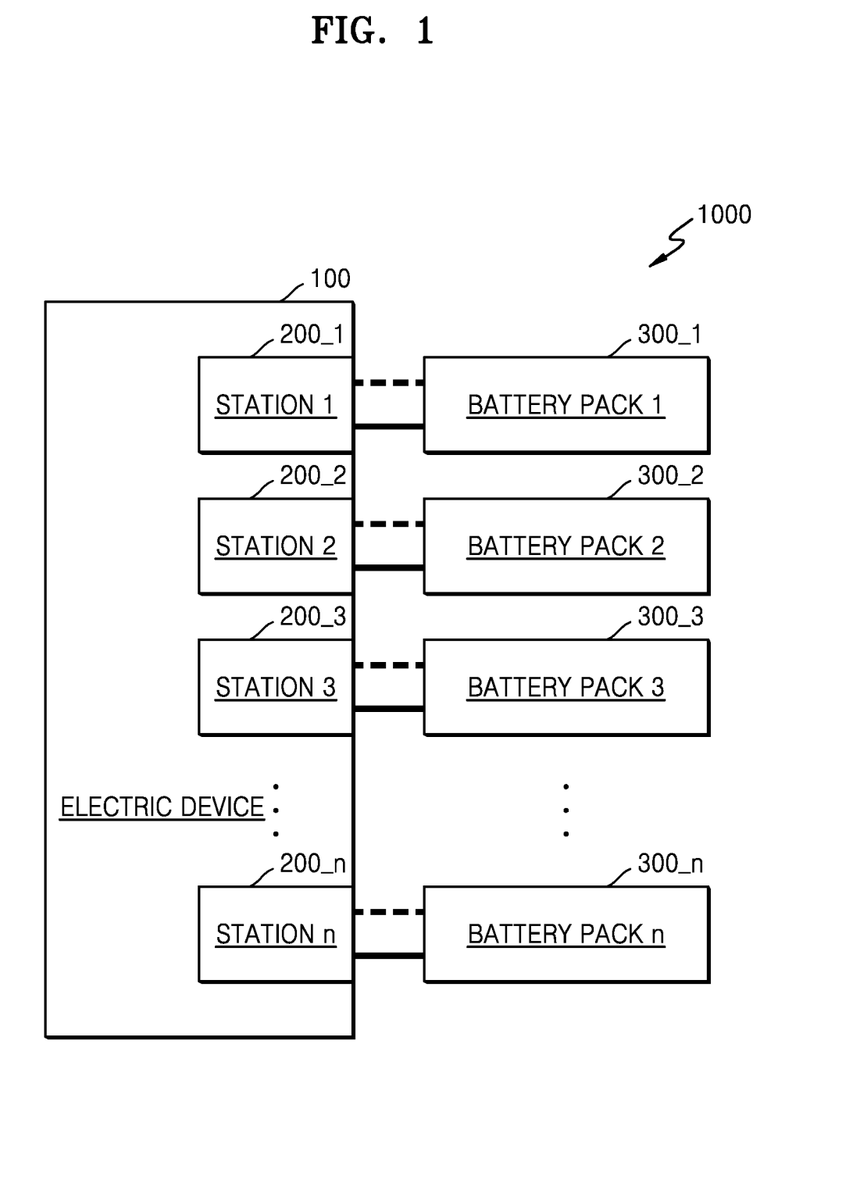
FIG. 1 schematically illustrates a battery system according to some embodiments in terms of a power source.

FIG. 1 schematically illustrates a battery system according to some embodiments in terms of a power source.

Referring to FIG. 1, a battery system 1000 may include an electric device 100 in which a plurality of stations 200_1 through 200_n are mounted. The battery system 1000 may further include battery packs 300_1 through 300_n, which may be respectively coupled with the plurality of stations 200_1 through 200_n.

The stations 200_1 through 200_n may be collectively referred to as a station 200, and the battery packs 300_1 through 300_n may be collectively referred to as a battery pack 300. The battery pack 300 may include at least one battery cell and a battery controller (e.g., a battery management unit) for managing the at least one battery cell.

The battery system 1000 may refer to any system that supplies power to the battery cells of the battery pack 300, or that uses the power stored in the battery cells. According to an example, the battery system 1000 may be a battery charging system (e.g., a battery charging station) for charging the battery cells of the battery packs 300. In this case, the electric device 100 may include a battery charging device and an integrated controller, and may further include a power circuit such as a converter circuit, a user interface device, and the like. The battery system 1000 might not include the battery packs 300, and instead may be coupled with the battery packs 300.

The user may couple the battery packs 300 that need charging with the stations 200 of the battery charging system 1000, and the battery charging system 1000 may charge the battery packs 300, and the user may separate the battery packs 300 of which charging is completed from the stations 200. The battery charging system 1000 may include a fare imposing system for imposing a cost corresponding to the charging of the battery packs 300.

Fully-charged battery packs 300 may be coupled with at least part of the stations 200 of the battery charging system 1000. The user may separate the fully-charged battery packs 300 from the battery charging system 1000 and may use the fully-charged battery packs 300 according to his/her own purpose. For example, the fully-charged battery packs 300 may be used in an electric transportation device, such as the user's electric bicycle or kickboard.

According to another example, the battery system 1000 may be an electric transportation system such as an electric vehicle, an electric bicycle, an electric kickboard, or the like, which uses power stored in the battery cells of the battery packs 300. In this case, for example, the electric device 100 may include a motor device driven using the power stored in the battery cells of the battery packs 300 and an integrated controller, and may further include a power circuit such as an inverter circuit or a converter circuit, a user interface device, and the like. The battery system 1000 may include the battery packs 300.

According to another example, the battery system 1000 may be an energy storage system that uses the battery cells of the battery packs 300 as a power storage. In this case, the electric device 100 may include a converter circuit for supplying a direct current (DC) to the battery packs 300, an inverter circuit for generating an alternating current (AC) from power output from the battery packs 300, and an integrated controller. The battery system 1000 may include the battery packs 300.

The station 200 may be a device for interfacing the electric device 100 and the battery packs 300. The station 200 may electrically connect power terminals of the electric device 100 to power terminals of the battery packs 300. FIG. 1 illustrates a pair of wires for transmitting power between the stations 200 and the battery packs 300. Wires connected to the stations 200 within the electric device 100 may be differently connected according to the function of the battery system 1000. Thus, the wires within the electric device 100 are not shown in FIG. 1.

Also, the station 200 may provide a communication path between a system controller of the electric device 100 and a battery controller of the battery pack 300. The communication path may be a CAN bus composed of two signal lines CAN-H and CAN-L. In addition, the station 200 may provide a signal indicating the coupling of the battery pack 300 to the system controller of the electric device 100, may transmit a control signal from the system controller to the battery controller of the battery pack 300, or may operate the battery controller of the battery pack 300 based on the control signal from the system controller.

The station 200 may further include functional circuits according to the purpose of the battery system 1000. For example, when the battery system 1000 is a battery charging system or a battery charging station, the station 200 may include a charging circuit. The charging circuit may be a rectification circuit for generating a DC voltage from an AC voltage, or a converter circuit for generating a DC voltage at a different level from the DC voltage. Furthermore, the station 200 may further include a controller for controlling the charging circuit, and a maintenance capacitor for maintaining a charging voltage.

The battery pack 300 may include at least one battery cell, a protection circuit, and a battery controller. The battery cell may include a rechargeable secondary battery. For example, the battery cell may include a nickel-cadmium battery, a lead acid battery, a nickel metal hydride (NiMH) battery, a lithium ion battery, a lithium polymer battery, and the like. The battery cells may be connected to each other in series, in parallel, or in a combination of series and parallel, and the number of the battery cells may be determined according to an output voltage required for the battery pack 300.

The protection circuit that is a circuit for protecting the battery cells may include a charging control switch, a discharging control switch, a fuse, and the like. The battery controller may control the protection circuit by monitoring the state of the battery cells, and may transmit the state of the battery cells to the system controller.

FIG. 1 illustrates that all of the battery cells 320 are coupled with the stations 200. However, this is just an example. In other embodiments, only some of the battery packs 300 may be coupled with the corresponding stations 200. As an example, any one of the battery packs (for example, a first battery pack 300_1) may be separated from a corresponding one of the stations (for example, a first station 200_1). Accordingly, a new battery pack may be coupled with the first station 200_1 so that the first battery pack 300_1 may be replaced.

Figure 2:
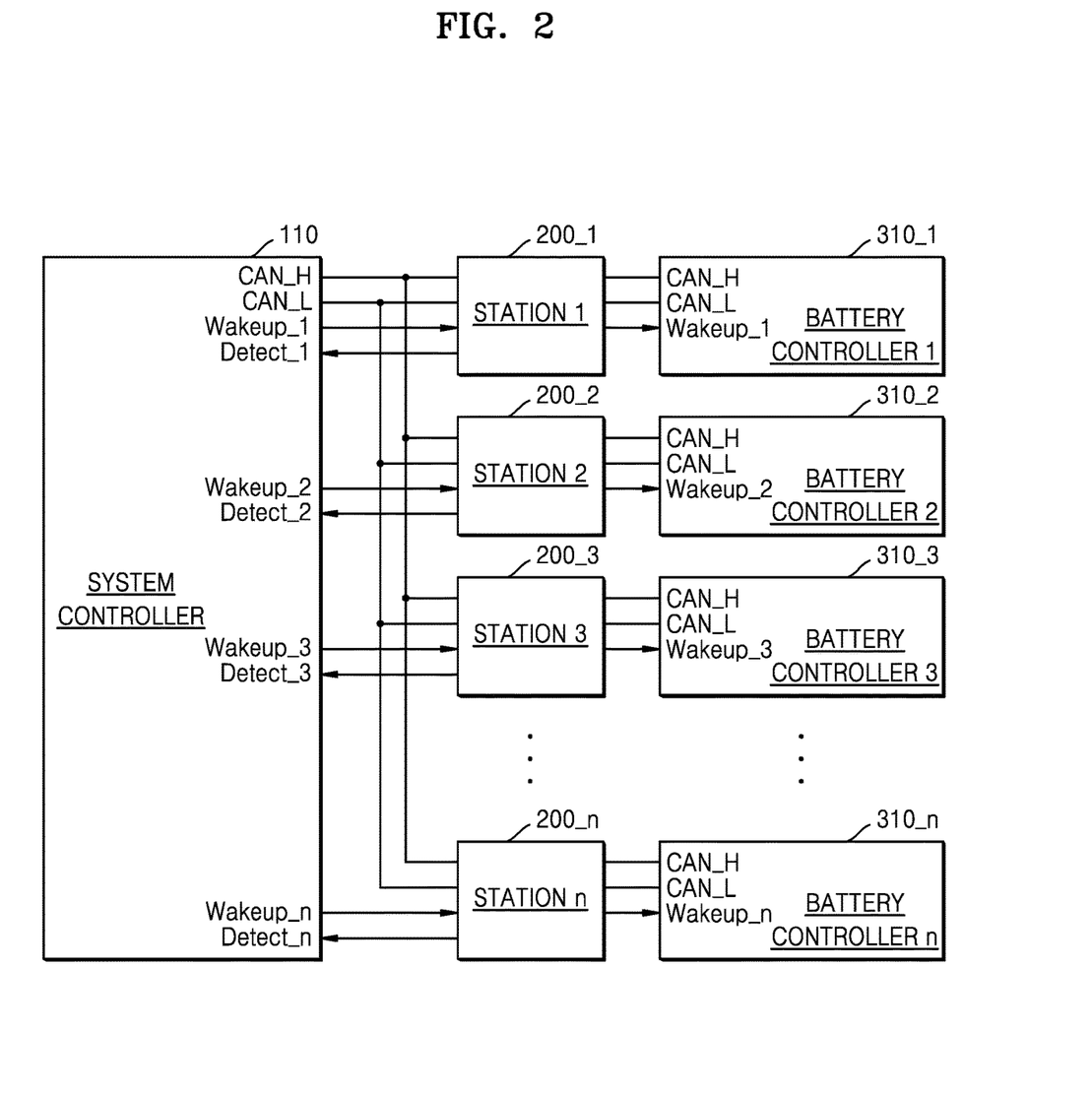
FIG. 2 schematically illustrates a battery system according to some embodiments in terms of communication.

FIG. 2 schematically illustrates a battery system according to some embodiments in terms of communication.

Referring to FIG. 2, a system controller 110, a plurality of stations 200_1 through 200_n, and a plurality of battery controllers 310_1 through 310_n are shown.

The system controller 110 may be included in the electric device 100 of FIG. 1, and may control the overall operation of the electric device 100. The system controller 110 may be an integrated controller of the electric device 100. The system controller 110 may include one or more microcontrollers.

The plurality of stations 200_1 through 200_n may transmit detection signals Detect_1 through Detect_n to the system controller 110, and may transmit wake-up signals Wakeup_1 through Wakeup_n, which may be received from the system controller 110, to the corresponding battery controllers 310_1 through 310_n. The first station 200_1 may output a first detection signal Detect_1 to the system controller 110, and may transmit a first wake-up signal Wakeup_1 received from the system controller 110 to the first battery controller 310_1. The stations 200_1 through 200_n, the detection signals Detect_1 through Detect_n, and the wake-up signals Wakeup_1 through Wakeup_n may be collectively referred to as the station 200, a detection signal Detect, and a wake-up signal Wakeup, respectively.

The plurality of battery controllers 310_1 through 310_n may be respectively included in the battery packs 300_1 through 300_n of FIG. 1. The plurality of battery controllers 310_1 through 310_n may be collectively referred to as the battery controller 310. The battery controller 310 may monitor the state (e.g., a voltage, a charging/discharging current, a temperature, and the like) of the battery cells of the battery pack 300, and may control the protection circuit. For example, the battery controller 310 may turn off the charging control switch when the voltage of the battery cells exceeds an overvoltage reference value, and may turn off the discharging control switch when the voltage of the battery cells is less than a low voltage reference value. Further, when the temperature of the battery cells is out of a preset range, the battery controller 310 may turn off charging and/or discharging control switches.

The system controller 110 may communicate with the battery controllers 310 through the stations 200. The system controller 110 may communicate with the battery controllers 310 through a CAN bus composed of a pair of CAN signal lines CAN_H and CAN_L. The system controller 110 may be connected to the CAN bus, and the stations 200 may be connected to respective nodes of the CAN bus. When the battery pack 300 is coupled with the station 200, the battery controller 310 may be connected to the CAN bus through the station 200. CAN communication may be used for a communication protocol between the system controller 110 and the battery controllers 310. However, the present disclosure is not limited thereto, and any communication protocol that transmits data or commands using a bus line may be used in other embodiments.

When the battery pack 300 is coupled with the corresponding station 200, the station 200 may detect that the battery pack 300 has been coupled with the station 200, and may output the detection signal Detect to the system controller 110. The station 200 may include a sensor for detecting that the battery pack 300 has been coupled with the station 200. For example, the sensor may be a push switch of which a state thereof is changed by the combination or connection of the battery pack 300. According to another example, the sensor may be a proximity sensor for detecting that the battery pack 300 is located at a certain position.

The system controller 110 may output the wake-up signal Wakeup for waking up the battery pack 300 in response to the detection signal output by the station 200. When the battery pack 300 is coupled with the station 200, the battery controller 310 of the battery pack 300 may be in a shutdown state. The station 200 may wake up the battery controller 310 of the battery pack 300 in response to the wake-up signal Wakeup output from the system controller 110.

For example, when it is assumed that a new first battery pack 300_1 is being coupled with the first station 200_1, the first battery controller 310_1 of the first battery pack 300_1 may be in a shutdown state before the first battery pack 300_1 is coupled with the first station 200_1. When the first battery pack 300_1 is coupled with the first station 200_1, the first station 200_1 may detect that the first battery pack 300_1 has been coupled with the first station 200_1, and may output the first detection signal Detect_1 to the system controller 110. The system controller 110 may receive the first detection signal Detect_1, and may output the first wake-up signal Wakeup_1 in response to the first detection signal Detect_1. The first wake-up signal Wakeup_1 may be a signal for waking up the first battery controller 310_1. According to an example, the first station 200_1 may transmit the first wake-up signal Wakeup_1 to the first battery controller 310_1=to thereby wake up the first battery controller 310_1.

The CAN bus may include a pair of CAN signal lines CAN_H and CAN_L. The CAN bus may be connected to the system controller 110, and may be connected to the battery controllers 310 through the stations 200. Communication between the system controller 110 and the battery controllers 310 through the CAN bus will be described with reference to FIGS. 3 and 4.

Figure 3:
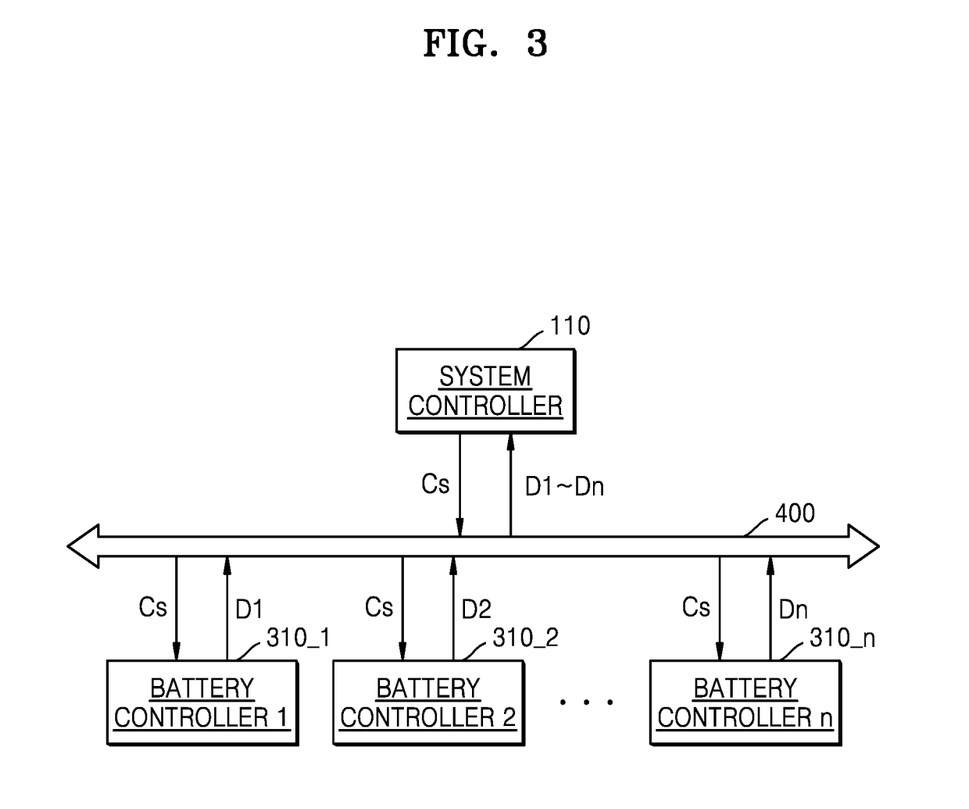
FIG. 3 is a block diagram illustrating a communication system having a master-slave structure.

FIG. 3 is a block diagram illustrating a communication system having a master-slave structure.

Referring to FIG. 3, the communication system may include the system controller 110, the plurality of battery controllers 310_1 through 310_n, and a CAN bus 400.

The system controller 110 may transmit a frame signal Cs including commands to the CAN bus 400. The first through n-th battery controllers 310_1 through 310_n may receive the frame signal Cs, and may perform operations corresponding to the commands included in the frame signal Cs. The frame signal Cs may include an ID allocation command, and may be transmitted to the corresponding battery controllers 310_1 through 310_n of the battery packs 300_1 through 300_n that have been newly replaced using a default ID. The battery controllers 310_1 through 310_n may have the default ID until the ID allocation command is received. In some embodiments, the default ID that is a preset ID may be 0x00, for example.

The frame signal Cs may include a command for controlling the battery controllers 310_1 through 310_n, and may be transmitted to corresponding ones of the battery controllers 310_1 through 310_n using IDs allocated through the ID allocation command. IDs corresponding to positions of the battery packs 300_1 through 300_n may be allocated to the battery controllers 310_1 through 310_n. For example, an ID of 0x01 corresponding to the position of the first battery pack 300_1 may be allocated to the first battery controller 310_1 of the first battery pack 300_1. An ID of 0x0k corresponding to the position of a k-th battery pack 300_k may be allocated to a k-th battery controller 310_k of the k-th battery pack 300_k. An ID of 0x14 corresponding to the position of a twentieth battery pack 300_20 may be allocated to a twentieth battery controller 310_20 of the twentieth battery pack 300_20.

Each of the first through n-th battery controllers 310_1 through 310_n may transmit frame signals D1 through Dn including data to the CAN bus 400. In this case, the first through n-th battery controllers 310_1 through 310_n may transmit the frame signals D1 through Dn including unique IDs allocated to the first through n-th battery controllers 310_1 through 310_n to the system controller 110 so as to reduce the likelihood of, or prevent, data collision. The system controller 110 may receive the transmitted frame signals D1 through Dn and may perform processing according to a pre-designed algorithm.

The frame signals D1 through Dn may be transmitted to the battery controllers 310_1 through 310_n in addition to the system controller 110. For example, the frame signal D1 transmitted by the first battery controller 310_1 may be transmitted to the remaining battery controllers 310_1 through 310_n in a broadcast manner.

A method of transmitting data in a communication system having the master-slave structure described above will be described in detail.

Figure 4:
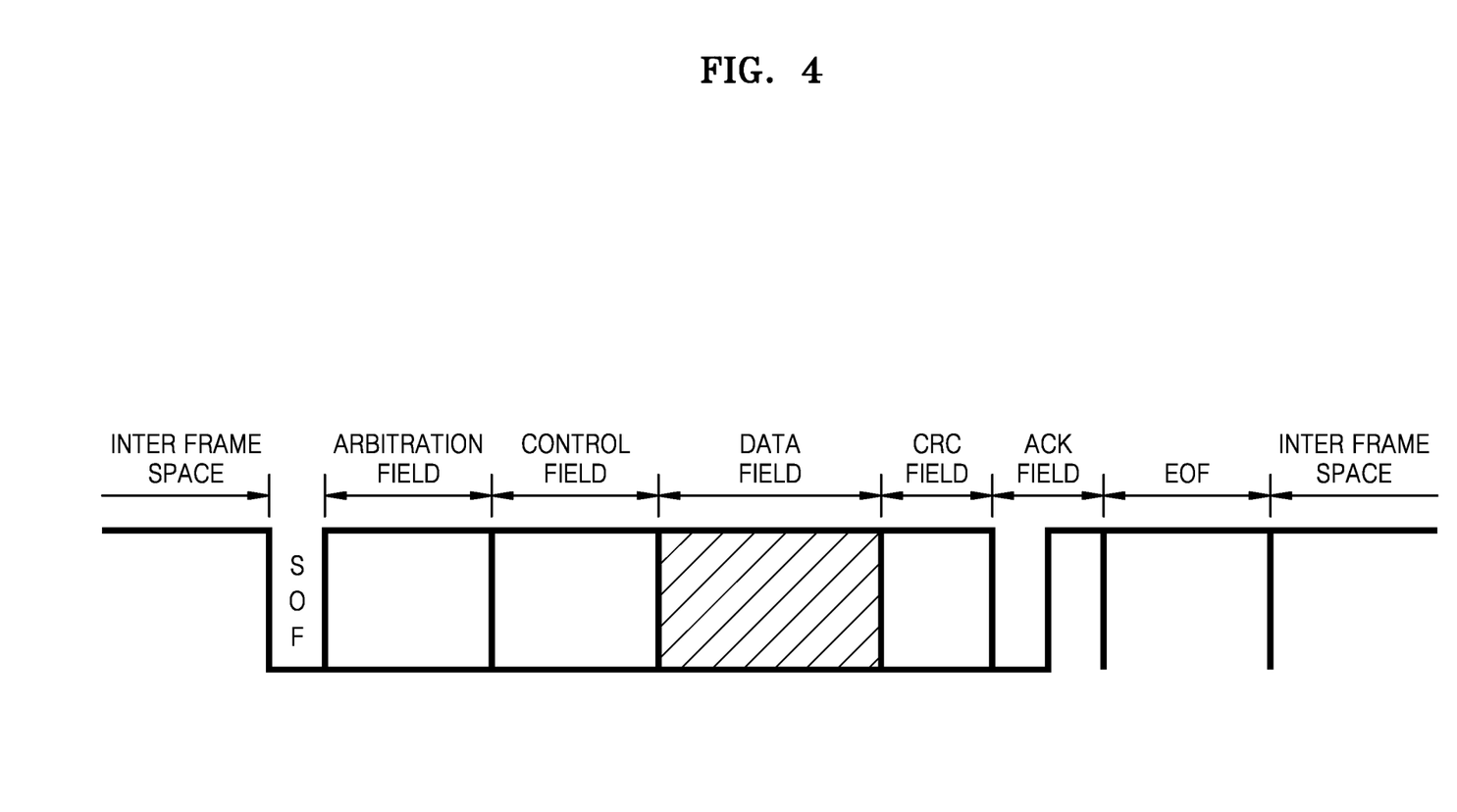
FIG. 4 illustrates a frame structure of a CAN communication protocol.

FIG. 4 illustrates a frame structure of a CAN communication protocol.

A controller area network (CAN) is a communication protocol developed by the BOSCH company so as to apply to the automotive industry (BOSCH is a trademark of Robert Bosch GMBH). Recently, the CAN communication protocol has been applied in various industrial fields, as well as the automotive field, and is a serial network communication method having a multi-master message method regulated at the speed of ISO 11898 Specification.

'Start of Frame (SOF)' is composed of one dominant bit, marks the start of a message frame, and is used for synchronization of all nodes. 'SOF' is located at the top of the message frame, and has a dominant bit of '0(d)' by default.

'Arbitration Field' is composed of an ID having the size of, for example, 11 bits or 29 bits, and a Remote Transmission Request (RTR) of, for example, 1 bit. 'Arbitration Field' is used to coordinate collisions between messages that may occur when the transmission of the messages from two or more nodes occurs simultaneously. A value of the RTR bit may be used to determine whether the current message frame is a data frame (e.g., 'd') or a remote frame (e.g., cry). When the current message frame is a data frame for transmitting data, the RTR bit may have a value of '0'. On the other hand, when the current message frame is a remote frame for requesting data transmission, the RTR bit may have a '1(r)' value, which is a recessive bit.

'Control Field' is composed of, for example, a 2-bit IDentifier Extension (IDE) and, for example, a 4-bit Data Length Code (DLC). The 2-bit IDE may be a reserved region, and the 4-bit DLC may represent the number of bytes of a data field.

'Data Field' includes data to be transmitted from the data frame. 'Data Field' may use up to, for example, 8 bytes (1 byte being 8 bits). Each byte may be transmitted from a most significant bit (MSB).

'Cyclic Redundancy Code (CRC) Field' is composed of, for example, a 15-bit CRC sequence generated using bit streams from 'SOF' to 'Data Field' and a CRC Delimiter of, for example, one '1(r)' bit. 'CRC Field' is used to check whether an error is present or absent in a message.

'ACK Field' is composed of, for example, a 1-bit 'ACK Slot' and, for example, a 1-bit 'ACK Delimiter'. When a correct message is received from an arbitrary node, the value of 'ACK Slot' may be set to '0(d)' at the moment of receiving 'ACK Field', and may be continuously transmitted on a bus.

'End of Frame (EOF)' is composed of, for example, 7 bits having a value of '1(r)', and may indicate that the message frame has ended.

'Inter frame Space' includes 'Intermission' and 'Bus Idle', and distinguishes the previous message frame or next message frame from the current message frame.

Hereinafter, a method of allocating IDs, which correspond to positions of battery packs, to battery controllers by using a system controller in a communication system including the system controller functioning as a master (or a host), and the battery controllers functioning as a slave, will be described.

Figure 5:
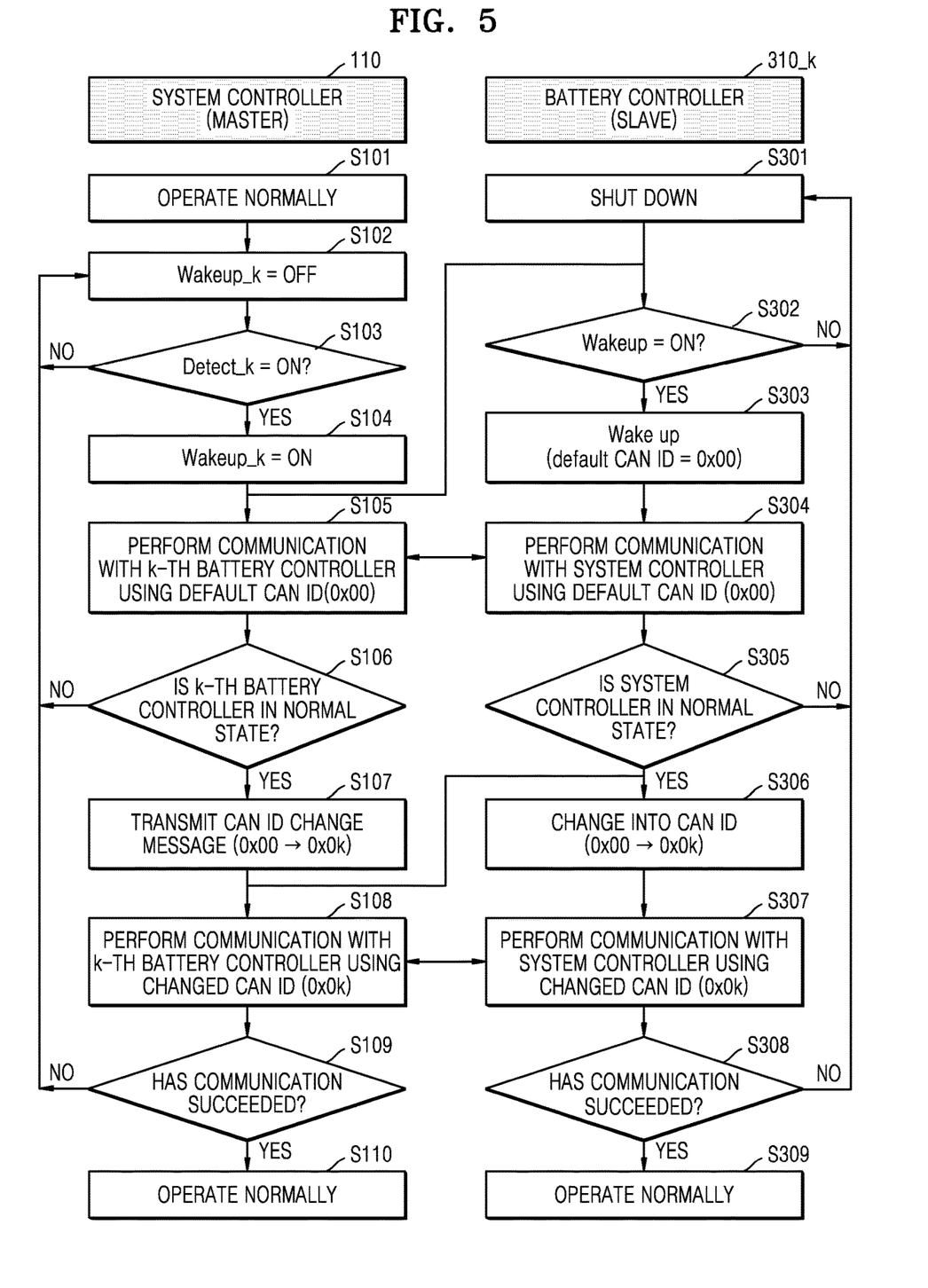
FIG. 5 is a flowchart illustrating operations of a system controller and battery controllers, in which the system controller allocates IDs to the battery controllers, according to an embodiment.

FIG. 5 is a flowchart illustrating operations of the system controller and the battery controllers, in which the system controller allocates IDs to the battery controllers, according to some embodiments.

Referring to FIG. 5, the system controller 110 and the k-th battery controller 310_k are illustrated as an example. The system controller 110, which is a controller for controlling the electric device 100 of FIG. 1, may be an integrated controller of the electric device 100 functioning as a master or host. The k-th battery controller 310_k, which is a battery controller included in the k-th battery pack 300_k that is one of the battery packs 300 of FIG. 1, may function as a slave with respect to the system controller 110. It is assumed that the k-th battery controller 310_k is included in the k-th battery pack 300_k to be coupled with a k-th station 200_k of FIG. 1. The k-th battery controller 310_k is in a shutdown state in Operation S301.

The system controller 110 may operate normally in Operation S101. The system controller 110 may already be in communication with other battery controllers 310_1 through 310_(k−1) and 310_(k+1) through 310_n (e.g., might not be in communication with the k-th battery controller 310_k). The system controller 110 may output wake-up signals Wakeup-1 through Wakeup-(k−1) and Wakeup-(k+1) through Wakeup-n corresponding to other battery controllers 310_1 through 310_(k−1) and 310_(k+1) through 310_n in an enabled state ON so as to maintain other battery controllers 310_1 through 310_(k−1) and 310_(k+1) through 310_n in a wake-up state.

The k-th battery pack 300_k including the k-th battery controller 310_k may be yet to be coupled with the k-th station 200_k, and the k-th battery controller 310_k may be in a shutdown state or sleep state. The system controller 110 may maintain the k-th wake-up signal Wakeup-k output to the k-th station 200_k in a disabled state in Operation S102.

The system controller 110 may determine whether the k-th detection signal Detect-k has been received in Operation S103. Subsequently, the k-th battery pack 300_k may become coupled with the k-th station 200_k. The k-th station 200_k may output a k-th detection signal to the system controller 110. When the system controller 110 receives the k-th detection signal Detect-k, the k-th wake-up signal Wakeup-k may be output in Operation S104. The k-th wake-up signal Wakeup-k may be transmitted to the k-th battery controller 310_k through the k-th station 200_k.

The k-th battery controller 310_k may determine whether the wake-up signal has been received in Operation S302. The k-th battery controller 310_k may be woken up while having a default CAN ID (for example, 0x00) in response to the k-th wake-up signal Wakeup-k output by the system controller 110 in Operation S303.

The system controller 110 may have a preset master CAN ID (for example, 0xFF), for example. Communication between the system controller 110 having the master CAN ID and the k-th battery controller 310_k having the default CAN ID may be performed in Operations S105 and S304.

The system controller 110 may determine whether the k-th battery controller 310_k is in a normal state (e.g., through communication of Operation S105) in Operation S106. Also, the k-th battery controller 310_k may determine whether the system controller 110 is in a normal state (e.g., through communication of Operation S304) in Operation S305.

When the system controller 110 determines that the k-th battery controller 310_k is in a normal state, the system controller 110 may transmit a message for changing the CAN ID to the k-th battery controller 310_k in Operation S107. The system controller 110 may transmit a message to change the CAN ID of the k-th battery controller 310_k to 0x0k in correspondence to the position of the k-the battery pack 300_k. The k-th battery controller 310_k may receive the CAN ID change message, and may change its own CAN ID to a designated CAN ID (for example, 0x0k) according to the message. Subsequently, communication between the system controller 110 having the master CAN ID and the k-th battery controller 310_k having the changed CAN ID (for example, 0x0k) may be performed in Operations S108 and S307.

The system controller 110 may determine whether communication of Operation S108 has succeeded in Operation S109. Also, in Operation S308, the k-th battery controller 310_k may determine whether the communication corresponding Operation S307 has succeeded.

When communication between the system controller 110 having the master CAN ID and the k-th battery controller 310_k having the changed CAN ID (for example, 0x0k) has succeeded, the system controller 110 may operate normally (e.g., according to a pre-programmed algorithm) in Operation S110. Also, the k-th battery controller 310_k may also operate normally (e.g., according to the pre-programmed algorithm) in Operation S309. For example, the system controller 110 may periodically command the k-th battery controller 310_k to report the current state, and the k-th battery controller 310_k may monitor the state of the battery pack 300_k in response to the command, and may transmit monitoring data to the system controller 110.

Figure 6:
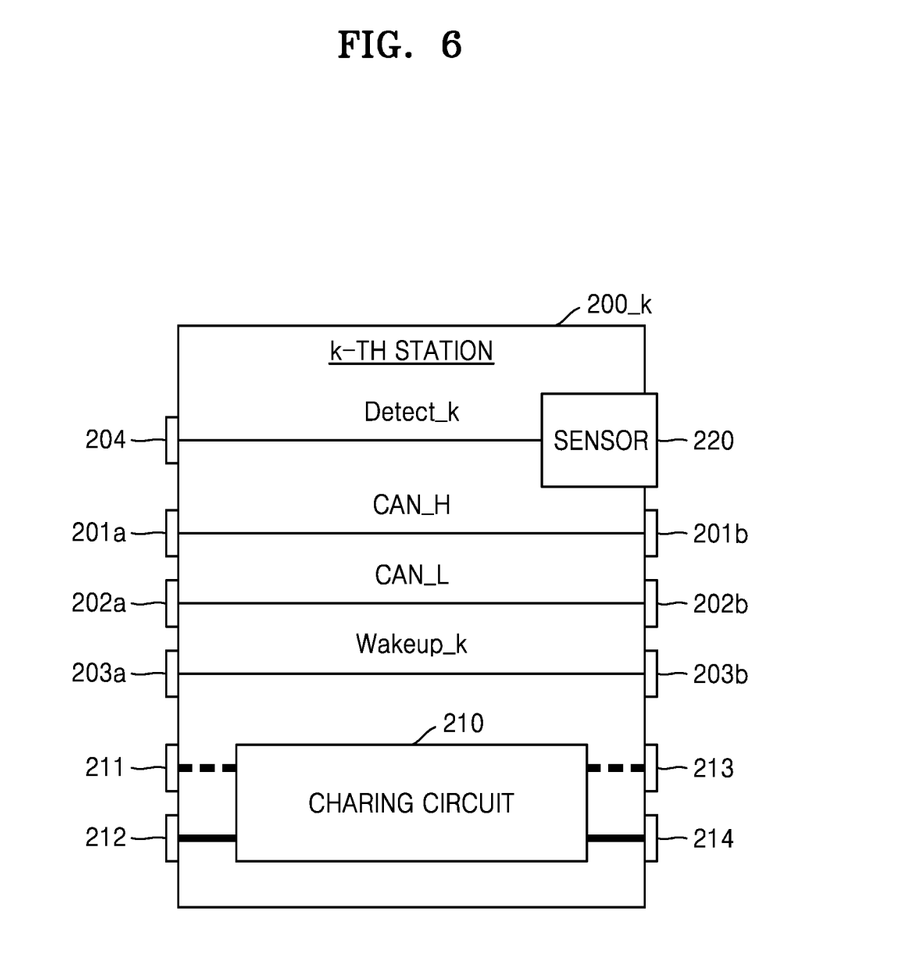
FIG. 6 schematically illustrates an internal configuration of a station according to an embodiment.

FIG. 6 schematically illustrates an internal configuration of a station according to some embodiments.

Referring to FIG. 6, the internal configuration of the k-th station 200_k that is one of the stations 200 of FIG. 1 is shown as an example.

The k-th station 200_k may include a charging circuit 210 for charging the battery cell of the k-th battery pack 300_k to be coupled with the k-th station 200_k. The battery system of FIG. 1 including the k-th station 200_k of FIG. 6 may be a battery charging device or battery charging station.

The k-th station 200_k may include input terminals 211 and 212 for receiving an input power source of the charging circuit 210, and output terminals 213 and 214 for outputting an output voltage of the charging circuit 210. An AC voltage or DC voltage may be input through the input terminals 211 and 212. The output terminals 213 and 214 may output a charging voltage for charging the battery pack 300_k.

The k-th station 200_k may include terminals 201a, 202a, and 203a, which may be connected to the system controller 110, and terminals 201b, 202b, and 203b, which may be connected to the k-th battery controller 310_k of the battery pack 300_k. The terminals 201a, 201b, 202a, and 202b may be terminals for respectively transmitting CAN signals received through the CAN bus between the system controller 110 and the k-th battery controller 310_k. The terminals 203a and 203b may be terminals for receiving a k-th wake-up signal Wakeup_k output by the system controller 110 and transmitting the k-th wake-up signal Wakeup_k to the k-th battery controller 310_k, respectively.

The k-th station 200_k may further include a sensor 220 for detecting whether the k-th battery pack 300_k has been coupled with the k-th station 200_k. For example, the sensor 220 may include a push switch, and may generate the detection signal Detect_k as the push switch is pressed when the k-th battery pack 300_k is coupled with the k-th station 200_k. The detection signal Detect_k may be transmitted to the system controller 110 through a terminal 204.

When the system controller 110 receives the detection signal Detect_k through the terminal 204, the system controller 110 may output a k-th wake-up signal Wakeup_k, and may output an input power source of the charging circuit 210 to the input terminals 211 and 212.

Figure 7:
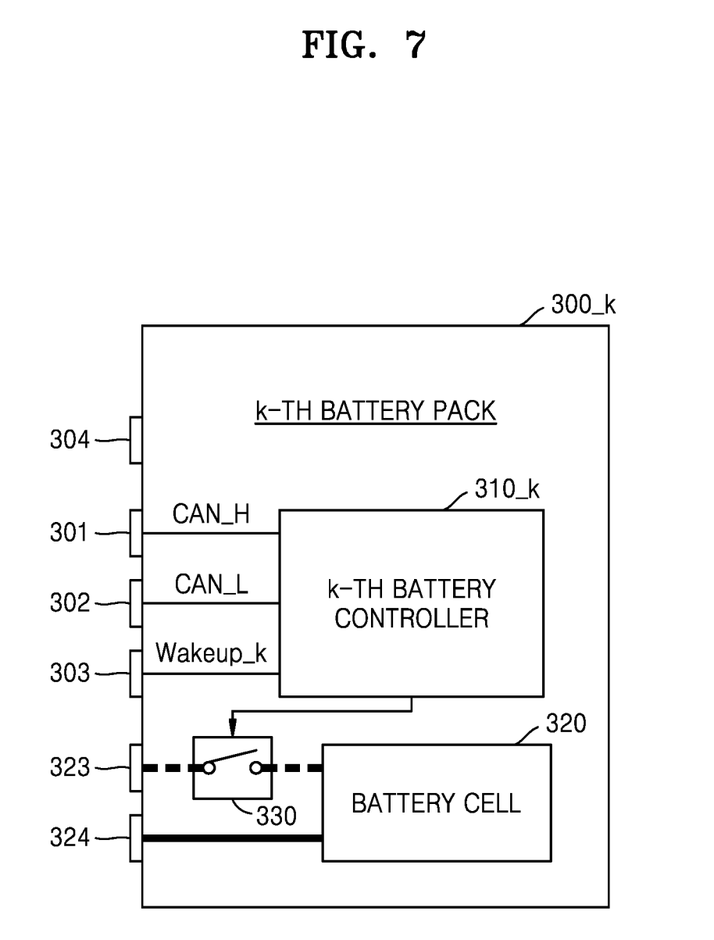
FIG. 7 schematically illustrates an internal configuration of a battery pack to be coupled with the station of FIG. 6, according to an embodiment.

FIG. 7 schematically illustrates an internal configuration of a battery pack to be coupled with the station of FIG. 6, according to some embodiments.

Referring to FIG. 7, the internal configuration of the k-th battery pack 300_k that is one of the battery packs 300 of FIG. 1 is illustrated as an example.

The k-th battery pack 300_k may include a k-th battery controller 310_k, at least one battery cell 320, and a protection circuit 330.

The k-th battery pack 300_k may include terminals 301, 302, 303, 323, and 324 to be respectively in contact with terminals 201b, 202b, 203b, 213, and 214 of the k-th station 200_k. The k-th battery pack 300_k may be connected to the CAN bus through the terminals 301 and 302, and may receive a wake-up signal Wakeup_k through the terminal 303. The k-th battery controller 310_k may be enabled in response to the wake-up signal Wakeup_k received through the terminal 303 and may have a default ID. The k-th battery controller 310_k may perform CAN communication with the system controller 110 by using the default ID.

The k-th battery pack 300_k may discharge or charge the voltage of the battery cell 320 through the terminals 323 and 324. The protection circuit 330 may be located between the battery cell 320 and at least one of the terminals 323 and 324 (in the present example, terminal 323). The protection circuit 330 may include at least one switch controlled by the battery controller 310_k. The protection circuit 330 may include at least one of the charging control switch, the discharging control switch, a main switch, and a pre-charge switch. The protection circuit 330 may include a fuse.

The k-th battery pack 300_k may further include a member 304 for improved operation of the sensor 220 of the k-th station 200_k. When the sensor 220 is a push switch, the member 304 may be a protrusion for pressing the push switch, and when the sensor 220 is a self-reactive contact sensor, the member 304 may be a magnet.

Figure 8:
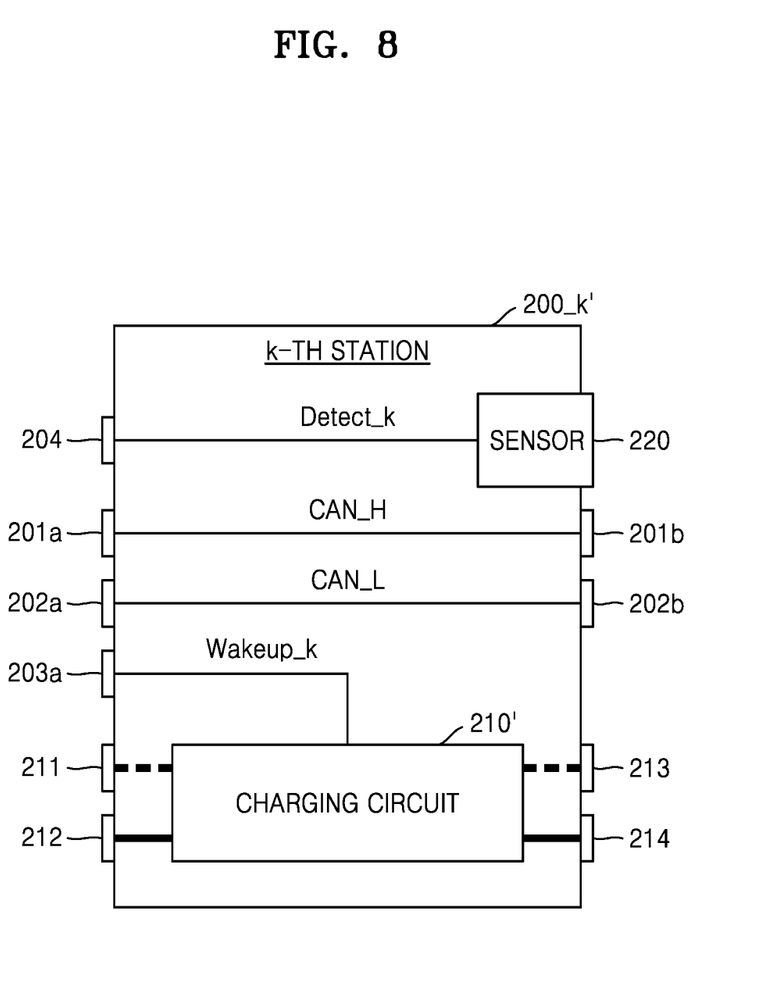
FIG. 8 schematically illustrates an internal configuration of a station according to another embodiment.

FIG. 8 schematically illustrates the internal configuration of a station according to other embodiments.

Referring to FIG. 8, the k-th station 200_k' is substantially the same as the k-th station 200_k of FIG. 6, except that the k-th station 200_k' omits terminal 203b and the charging circuit 210' receives the wake-up signal Wakeup_k.

The k-th station 200_k' of FIG. 8 may include the charging circuit 210' for receiving the wake-up signal Wakeup_k, and might not output the wake-up signal Wakeup_k to the battery pack 300_k.

The charging circuit 210' may operate in response to the wake-up signal Wakeup_k. The wake-up signal Wakeup_k to the charging circuit 210' may be an enable signal. That is, the charging circuit 210' may operate when the wake-up signal Wakeup_k is in an enabled state ON, and may stop an operation when the wake-up signal Wakeup_k is in a disabled state OFF.

Figure 9:
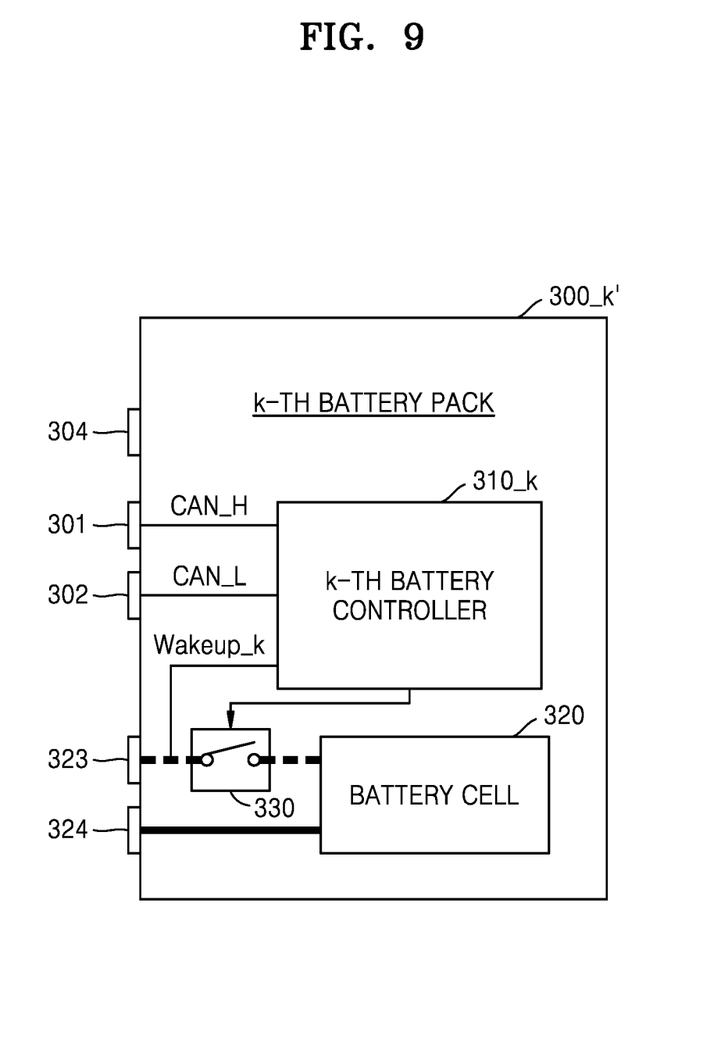
FIG. 9 schematically illustrates an internal configuration of a battery pack to be coupled with the station of FIG. 8, according to some embodiments.

FIG. 9 schematically illustrates an internal configuration of a battery pack to be coupled with the station of FIG. 8, according to some embodiments.

Referring to FIG. 9, the k-th battery pack 300_k' may omit terminal 303 for receiving the wake-up signal Wakeup_k. The k-th battery controller 310_k may detect that a charging voltage has been applied to the terminals 323 and 324, and may be woken up. The woken-up k-th battery controller 310_k may perform CAN communication with the system controller 110 by using a default ID, and may receive an ID allocation command from the system controller 110 so as to change an ID.

In a battery system according to the spirit of the present disclosure, even when a battery pack is replaced, an ID, which corresponds to a position where the battery pack is mounted, is newly allocated to a battery controller of the replaced battery pack. Thus, the battery controller of the battery pack may perform communication with a system controller. Thus, the battery system may operate stably, and the position where the battery pack is mounted and the ID may be matched to each other so that the state of the battery pack may be intuitively displayed to the user.

Various embodiments of the present disclosure are not intended to otherwise limit the scope of the present disclosure in any way. For the sake of brevity, conventional electronics, control systems, software development and other functional aspects of the systems (and components of the individual operating components of the systems) might not be described in detail. Furthermore, the connection lines, or connectors shown in the various figures presented are intended to represent examples of functional relationships and/or physical or logical couplings between the various elements. It should be noted that many alternative or additional functional relationships, physical connections, or logical connections may be present in a practical device. Moreover, no item or component is essential to the practice of the present disclosure unless the element is specifically described as "essential" or "critical".

Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present disclosure is not necessarily limited according to the description order of the steps. The use of any and all examples, or exemplary language (e.g., "such as") provided herein, is intended merely to better illuminate the disclosed embodiments, and does not pose a limitation on the scope of the present disclosure unless otherwise claimed. Numerous modifications and adaptations will be readily apparent to those skilled in this art without departing from the spirit and scope of the present disclosure.

It should be understood that embodiments described herein should be considered in a descriptive sense only and not for purposes of limitation. Descriptions of features or aspects within each example should typically be considered as available for other similar features or aspects in various embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A battery system comprising:
   a system controller connected to a controller area network (CAN) bus; and
   stations respectively connected to nodes of the CAN bus,
   wherein, a first station of the stations is configured to detect that a first battery pack has been coupled thereto, and is configured to transmit a first detection signal to the system controller, wherein the system controller is configured to provide a first wake-up signal for waking up the first battery pack to the first station in response to the first detection signal, wherein the first station is configured to wake up a first battery controller of the first battery pack in response to the first wake-up signal, wherein the first battery controller is configured to have a default identifier (ID) while being woken up, and wherein the system controller is configured to transmit a command for allocating a first ID, which is different from the default ID, corresponding to the first station to the first battery controller having the default ID via the CAN bus.

2. The battery system of claim 1, wherein the first battery controller is configured to have the default ID immediately after being woken up, to respond to a message to the default ID transmitted by the system controller, to change the default ID into the first ID in response to the command for allocating the first ID, and to respond to a message to the first ID transmitted by the system controller.

3. The battery system of claim 1, wherein the first station is configured to transmit the first wake-up signal to the first battery controller, and wherein the first battery controller is configured to be woken up while having the default ID in response to the first wake-up signal.

4. The battery system of claim 1, wherein the first station is configured to generate a charging voltage for charging the first battery pack in response to the first wake-up signal, and to output the generated charging voltage to the first battery pack, and wherein the first battery controller is woken up in response to the charging voltage.

5. The battery system of claim 4, wherein the battery system is a battery pack charging system for respectively charging battery packs that are attachable/detachable to/from the stations.

6. The battery system of claim 1, wherein the first station comprises a sensor configured to detect whether the first battery pack has been coupled with the first station, and to generate the first detection signal.

7. The battery system of claim 1, further comprising battery packs respectively coupled with the stations, the battery packs comprising:

at least one battery cell;

a protection circuit configured to protect the at least one battery cell; and a battery controller that is configured to monitor a state of the at least one battery cell to control the protection circuit, and that is connected to the CAN bus through a corresponding station of the stations.

8. The battery system of claim 1, wherein the stations are arranged in an order, and wherein IDs corresponding to the order are allocated to battery packs coupled with the stations.

9. A method of allocating a controller area network (CAN) identifier (ID) in a battery system that comprises a system controller connected to a CAN bus, and stations respectively connected to nodes of the CAN bus, the method comprising:

detecting, by a first station of the stations, that a first battery pack has been coupled with the first station;

transmitting a first detection signal to the system controller;

providing a first wake-up signal for waking up the first battery pack to the first station in response to the first detection signal by using the system controller;

waking up a first battery controller of the first battery pack in response to the first wake-up signal by using the first station;

transmitting a command for allocating a first ID corresponding to the first station to the first battery controller being woken up and having a default ID, which is different from the first ID, via the CAN bus, by using the system controller; and changing the default ID into the first ID in response to the command for allocating the first ID by using the first battery controller.

10. The method of claim 9, wherein the waking up of the first battery controller comprises:

generating a charging voltage for charging the first battery pack in response to the first wake-up signal and outputting the generated charging voltage to the first battery pack by using the first station; and waking up the first battery controller in response to the charging voltage.

* * * * *